US011481700B2

(12) United States Patent
Grundberg

(10) Patent No.: US 11,481,700 B2
(45) Date of Patent: Oct. 25, 2022

(54) ROUTE OPTIMIZATION METHODS AND DEVICES

(71) Applicant: CONSUMIQ AB, Gothenburg (SE)

(72) Inventor: Michael Grundberg, Öjersjö (SE)

(73) Assignee: CONSUMIQ AB, Gothenburg (SE)

(*) Notice: Subject to any disclaimer, the term of this patent is extended or adjusted under 35 U.S.C. 154(b) by 395 days.

(21) Appl. No.: 15/576,767

(22) PCT Filed: May 25, 2016

(86) PCT No.: PCT/SE2016/050484
§ 371 (c)(1),
(2) Date: Nov. 24, 2017

(87) PCT Pub. No.: WO2016/190805
PCT Pub. Date: Dec. 1, 2016

(65) Prior Publication Data
US 2018/0314991 A1 Nov. 1, 2018

Related U.S. Application Data

(60) Provisional application No. 62/166,202, filed on May 26, 2015.

(30) Foreign Application Priority Data

May 26, 2015 (SE) .................................... 1550676-9

(51) Int. Cl.
G06Q 30/00 (2012.01)
G06Q 10/04 (2012.01)
(Continued)

(52) U.S. Cl.
CPC .......... *G06Q 10/047* (2013.01); *G06Q 10/04* (2013.01); *G06Q 30/06* (2013.01); *G06Q 30/0639* (2013.01); *G06Q 30/02* (2013.01)

(58) Field of Classification Search
CPC ... G06Q 30/0601–0645; G06Q 10/047; G06Q 30/02; G06Q 10/04
(Continued)

(56) References Cited

U.S. PATENT DOCUMENTS 8,150,741 B2 4/2012 Figueroa
10,325,309 B2 * 6/2019 Gadre ................ G06Q 30/0639
705/26.7

(Continued)

FOREIGN PATENT DOCUMENTS

GB 2505423 A 3/2014
WO 2014005190 A2 1/2014

OTHER PUBLICATIONS

Hui, Ka-Chuen. "Analysis of Path Data in Marketing with Applications to Grocery Shopping." Order No. 3309447 University of Pennsylvania, 2008. Ann Arbor: ProQuest. Web. Sep. 18, 2020. (Year: 2008).*

(Continued)

Primary Examiner — Jeffrey A. Smith
Assistant Examiner — Kennedy Gibson-Wynn
(74) Attorney, Agent, or Firm — Tucker Ellis LLP

(57) ABSTRACT

The present invention elates to methods and devices for optimizing a route based on an electronic list, the method comprising the steps of: linking items in a list of items to a position in an area and providing a sorted optimized visiting order wherein the optimization is based on historical data comprising prior visited positions.

19 Claims, 6 Drawing Sheets

(51) Int. Cl.
*G06Q 30/06* (2012.01)
*G06Q 30/02* (2012.01)

(58) Field of Classification Search
USPC .......................................... 705/26.1–27.2, 6
See application file for complete search history.

(56) References Cited

U.S. PATENT DOCUMENTS

| | | | |
|---|---|---|---|
| 2002/0174021 | A1 | 11/2002 | Chu |
| 2008/0154720 | A1 | 6/2008 | Gounares |
| 2013/0046624 | A1 | 2/2013 | Calman |
| 2013/0132241 | A1* | 5/2013 | Sorenson ............... G06Q 10/08 705/28 |
| 2013/0166193 | A1* | 6/2013 | Goldman ........... G06Q 30/0633 |
| 2013/0290234 | A1* | 10/2013 | Harris ................... G06N 5/022 706/46 |
| 2014/0156450 | A1 | 6/2014 | Ruckart |
| 2014/0172476 | A1 | 6/2014 | Goulart |
| 2014/0279294 | A1* | 9/2014 | Field-Darragh ..... G06Q 10/087 705/28 |
| 2015/0169597 | A1* | 6/2015 | Edge ................... G06F 17/3087 |
| 2015/0221010 | A1* | 8/2015 | Ming ................... G06Q 10/087 705/26.61 |
| 2016/0063609 | A1* | 3/2016 | Argue ................ G06Q 30/0639 |
| 2016/0232448 | A1* | 8/2016 | Schroeder ............ G06Q 10/107 |
| 2018/0005309 | A1* | 1/2018 | Croy .................. G06Q 30/0603 |

OTHER PUBLICATIONS

Kim, J. (2004). A framework for roadmap-based navigation and sector-based localization of mobile robots (Order No. 3141414). Available from ProQuest Dissertations and Theses Professional. (305070310). Retrieved from https://dialog.proquest.com/professional/docview/305070310?accountid=131444 (Year: 2004).*

Ballester, Nicholas, et al. "Effect of Retail Layout on Traffic Density and Travel Distance." IIE Annual Conference. Proceedings (2014): 798-807. ProQuest. Web. Jul. 14, 2022. (Year: 2014).*

Swedish Office Action from corresponding Swedish Application No. 1550676-9, dated Nov. 10, 2015.

International Search Report and Written Opinion from corresponding International Application No. PCT/SE2016/050484, dated Sep. 5, 2016.

International Preliminary Report on Patentability from corresponding International Application PCT/SE2016/050484, dated Sep. 26, 2017.

Office Action from corresponding Canadian Application No. 2987190 dated Jun. 27, 2022.

* cited by examiner

| Shopping list | |
|---|---|
| Item | # |
| A | 2 |
| C | 1 |
| D | 3 |
| B | |
| E | |
| F | |
| K | |
| J | |

Fig. 1a

| Shopping list | |
|---|---|
| Item | # |
| A | 2 |
| E | 3 |
| D | 1 |
| C | |
| B | |
| F | |
| J | |
| K | |

Fig. 1b

ROUTE OPTIMIZATION METHODS AND DEVICES

TECHNICAL FIELD

The present invention relates generally to a method, device and techniques for optimizing routes based on a list and in particular assisting a user with an electronic list, e.g. on a mobile device, and optimizing e.g. shopping experience by determining a route for shopping in a store based on the items contained in the electronic list.

BACKGROUND

Finding an optimal route using a mobile terminal is becoming more and more useful. The methods may be used for different types of "search and find" applications such as shopping, delivery and pickup, orienteering, etc. Moreover, electronic lists for shopping are becoming popular when users can easily generate "check" lists. One may generate a list on a mobile terminal such as a mobile phone or receive a list through email, SMS, MMS or other messaging service.

Most commonly, when consumers visit supermarkets and stores for shopping for products such as groceries, office supplies, and household wares they may use the list of objects to store in a mobile terminal, such as a cell phone. Typically, these stores can have dozens of aisles and/or sections. Accordingly, traversing these aisles looking for specific products may be a harrowing experience. Situations may arise where a consumer takes a brute force approach to shopping for products, where the consumer crosses the store multiple times to find all the intended products. Consumers may use a digital shopping list in order to better organize and remember their items when preparing to go shopping. The shopping list alone, however, may not be the complete solution to the problem of repeatedly crossing aisles during shopping or visiting the same regions of the stores multiple times.

Moreover, different stores have different layouts which means that even a fully sorted and organized shopping list might be of limited value if the user goes shopping in another store than originally planned.

SUMMARY

The present invention provides enhanced methods and arrangement for optimizing a route-handling generally and route optimizing based on a list in particular.

Moreover, the invention provides a dynamic system for optimizing route/list, e.g.:
  A user may pick items not previously picked in an area, the system can detect and analyze the increase of the assortment and location in proportion to the current assortment;
  A user may mark an item in a pick list that is not in the assortment and the system will detect the item;
  More than one user may use/modify same list at same time (add/remove items, pick in a store, etc.) and the sorting will be dynamically, i.e. updated substantially simultaneously depending on what each user does;
  Separate users can be at the same or two different places and the consequences for sorting may be depending on what in the list is changed, how it is changed and where the users are.

For these reasons a method for optimizing a route based on an electronic list is provided. The method comprises the steps of: linking items in a list of items to a position in an area and providing a sorted optimized visiting order. In one embodiment the electronic list is a pick list. The method may further comprise the steps of: a computer receiving said electronic list including a plurality of items; the computer processing the list and linking items to locations and grouping the same; generating a route list with respect to the plurality of the items and locations without access to a fully predefined area information; providing a user terminal with resulted route; and completing the route with respect to the user completing the list with items in said plurality of item's list. The method may further comprise: for each area, building an undirected graph in which each location for an item is realized as node, and each pair of nodes that probably is closest to each other has an edge between them with a length that varies with the probability that they are closest to each other; for each combination of user, area and pair of possible location, analyzing if it is likely that one location always will be visited before others; and when sorting a pick list, solving an optimization problem in the graph by taking into account both using probabilities and providing a solution, individually tailored for the user under the preceding step. In ONE embodiment the optimization problem is a Travelling Salesman Problem (TSP).

The method may further comprise one or several of: eliminating the lists that do not seem to come from a real visit to an area; for each pick list, not using the items in the list, which could be linked to multiple locations if there is no sufficient data to distinguish the locations; getting information on which locations that are so close that they can be considered to be at the same place, to group in each list the consecutive items that can be considered linked to the same location; for each pair of locations, computing their presence in all lists; eliminating one of the locations in all of the lists; eliminating the lists containing too few places to bring forward the analysis; for each list, grouping the consecutive items that have been picked within an unreasonably short time and using instead the user's manual sort to determine the outcome; for all outcomes of lists for a specific area, computing the occurrence of each pair of locations; for all outcomes of pick lists for an area, computing the occurrence of each triplet; and for each pair of locations, calculating a distance between them as the inverse of the probability. The method may further comprise: for each list, not using individual items in the list that cannot be linked to one or more locations, after eliminating the lists that do not seem to come from a real visit to an area. The method may further comprise one or several of: filtering and cancelling edges whose length is above a certain threshold; if edges are disregarded, partitioning the graph; between the nodes having the shortest distance, forming edges having length equal to the calculated distance; and storing the nodes and edges in the database.

In one embodiment, for all outcomes of lists for a specific area, computing the occurrence of each pair of locations further comprises using the calculated statistics, calculating the probability that two points are closest to each other, wherein two locations that are closest have no other locations between them, i.e. for each pair of points A and B and any other location x:

$$P_{closest} = P_{always\ together} \times (1 - \max_x P_{AxB})$$

$$P_{always\ together} = n_{AB}/n_{AxB} \forall x$$

$$P_{AxB} = n_{AxB}/(n_{ABx} + n_{xAB} + n_{AxB})$$

wherein n is the number of occurrences of a location.

In one embodiment, if a location is visited in an unreasonably short time after another location, assuming that the user has marked both locations as picked on the same physical location instead of their respective physical locations.

In one embodiment, for each pair of locations, computing their presence in all lists further comprises for each pair where the locations were visited in direct sequence in a qualified majority of cases, but where the internal order does not matter, considering the two locations to be the same location.

In one embodiment, if edges are disregarded, the graph is partitioned, for each pair of nodes, where nodes are in different partitions, calculating a distance between the nodes in the following manner:

$$d_{AB} = \sum_{y=0}^{\infty} ((y+1) \times n_{AyB}) / \sum_{y=0}^{\infty} n_{AyB}$$

wherein y is the number of items picked between A and B, and n is the number of occurrences of a location.

One embodiment comprises: if access is available to information that shows that the area is similar to another area, the similar area data is used to influence the outcome of the graph. In one embodiment, if sensor data to an outcome of the list is accessible, the data is used to influence the outcome of the graph. One embodiment comprises using a positioning arrangement for detecting position of an item picked according to the list.

In one embodiment, the positioning arrangement comprises one or several of GPS, GLONASS, triangulation, optical positioning, IR positioning, RF beacons, Wi-Fi or Bluetooth.

One embodiment comprises generating a route list with respect to the plurality of the items and locations without access to a fully predefined area information further comprises dynamically updating the route list if changes to the list are made.

The invention also relates to a computer program product for optimizing a route based on an electronic list. The computer program product comprises one or more computer-readable tangible storage devices and program instructions stored on at least one of the one or more storage devices, the program instructions comprising linking items in a list of items to a position in an area and providing a sorted optimized visiting order. The computer program product may further comprise: program instructions to receive said electronic list including a plurality of items; program instructions to process the list with respect to location information; program instructions to generate a route list with respect to the plurality of the items and location without access to a fully predefined area information; program instructions to provide a user terminal with resulted route; and completing the route with respect to the user completing the list with items in said plurality of items list.

The invention also relates to a communication terminal arranged with a set of instructions for ordering, booking and/or paying for goods and/or service. The mobile terminal comprises a processing unit, a memory unit, a communication part, a display unit and a user interaction unit, said memory unit comprising said instructions and said processing unit being configured to: transmit an electronic list including a plurality of items; receive a route list with respect to the plurality of the items and location without access to a fully predefined area information; receive a resulted route; and transmit information for completing the route with respect to the user completing the list with items in said plurality of items list The invention also relates to computer unit comprising: a processing unit, memory and communication interface, wherein said processing unit is configured to: receive an electronic list including a plurality of items; to process the list with respect to location information; to generate a route list with respect to the plurality of the items and location without access to a fully predefined area information; to provide a user terminal with resulted route; and complete the route with respect to the user completing the list with items in said plurality of items list.

BRIEF DESCRIPTION OF THE DRAWINGS

Reference is made to the attached drawings, wherein elements having the same reference number designation may represent like elements throughout.

FIGS. 1a and 1b are diagrams of exemplary lists;

DETAILED DESCRIPTION

The following detailed description refers to the accompanying drawings. The same reference numbers in different drawings may identify the same or similar elements.

The term "entry", "goods", "item", "grocery", "object", and "address" as used herein, may refer to any object which can be sorted in a list. The term "list" as used herein, may refer to any type of structured names or series of records in a file. The terms "location" and "position" as used herein may refer to a specific general point in physical space, e.g. a corridor/passage, zone, etc.

In the following, the invention is described with reference to an embodiment relating to shopping. However, it will be evident for a skilled person that the teachings of the invention may be used for other applications such as orienteering, navigation, pickup/delivery of goods, etc.

In its simplest form, the invention concerns linking items in a list of items to a location in an area and provide a user a sorted list of items comprising an optimized list (picking order or directions). Thus, the method of the invention receives a first list, e.g. pick or destination list and provides an optimized, sorted visit list. The production of the lists may be based on analysis of several pick lists from same area (e.g. store).

FIG. 1a illustrates an exemplary shopping list in a mobile terminal, such as a cell phone or smart phone. The list comprises items A-K, for example milk, bread, soap, fruit, etc. The items in the list are entered for example at home by the user before going to store or received from another party. Usually, the list is not sorted and not organized after the placement in the store.

Figure 2:
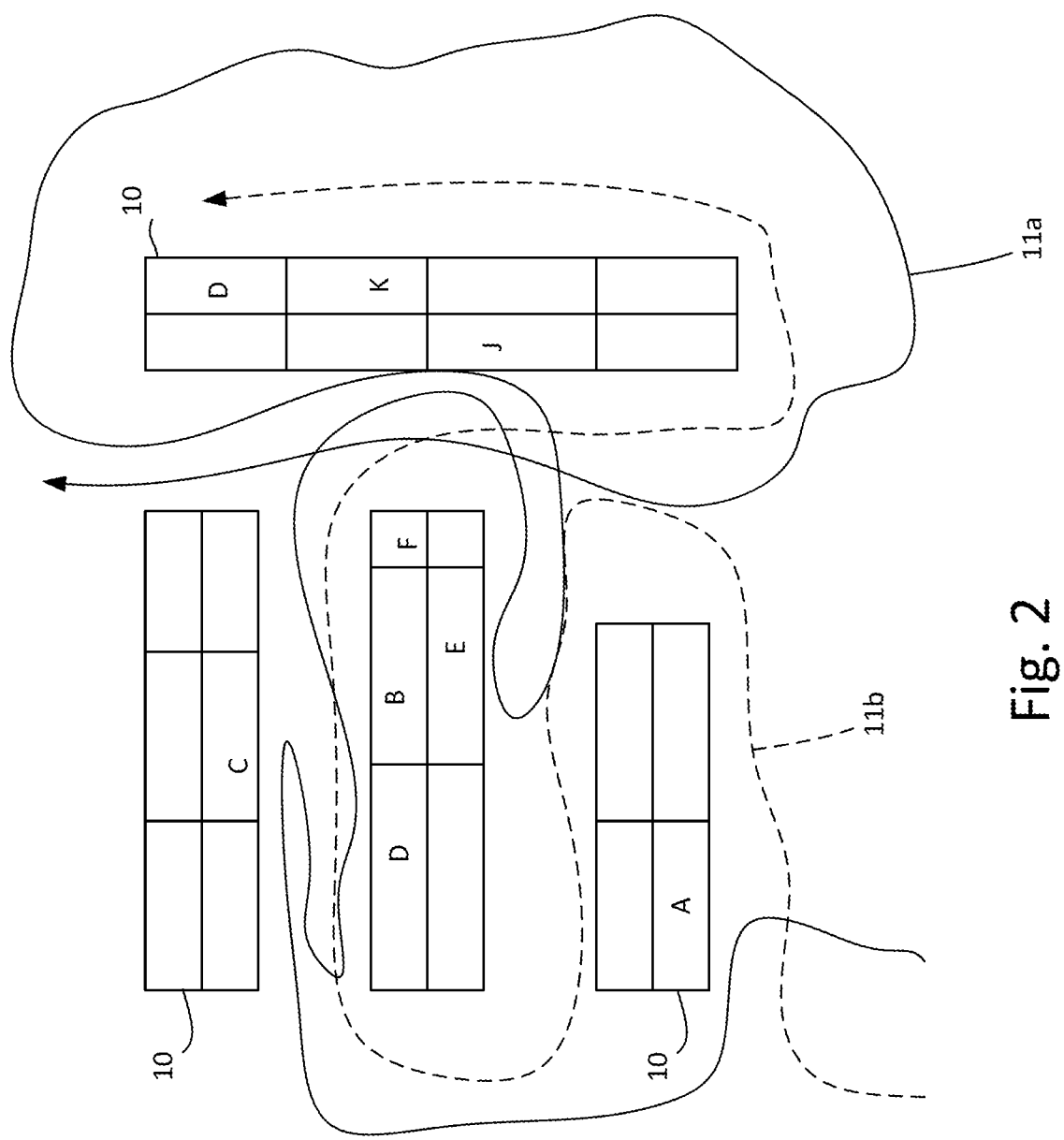
FIG. 2 illustrates a schematic top view of a store and different routes.

FIG. 2 illustrates an exemplary elevation view of a floor plan of a store with goods A-K placed on the shelves 10. The solid line 11a illustrates a possible route which a shopper may take for picking items according to the list. This route follows the list according to FIG. 1a.

List of FIG. 1b illustrates a list sorted and optimized in accordance with the teachings of the invention and dashed line 11b illustrates an exemplary optimized route for a shopper according to the present invention.

According to one exemplary embodiment, the invention optimizes the pick list (route) without access to a predefined map or with access to a map that alone is not enough to optimize pick lists. Here, the "pick list" is defined as a list of items, where each item can be checked when the user picks the item reaches a location. It may also relate to positions/addresses instead of items. What "picked" means may vary depending on the application, it can be done/visited/taken, etc.

One objective of the invention is to sort a pick list for a specific field such that the route, which is formed by a user picking the items in a sorted order, is as short as possible and this without the availability of a good pre-defined map of the area.

Figure 3:
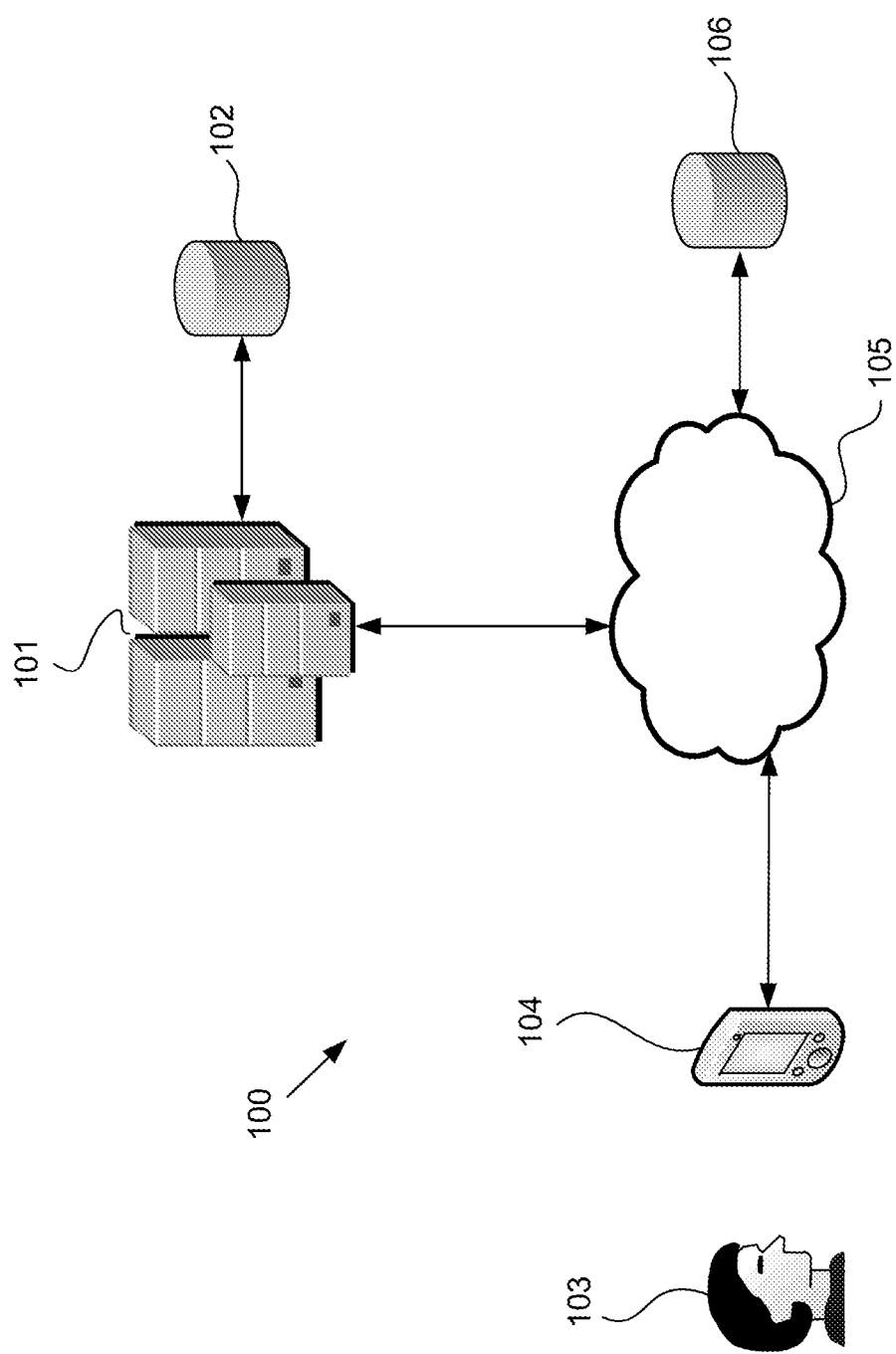
FIG. 3 is an exemplary system of the invention.

The system 100 according to one aspect of the invention, as illustrated schematically in FIG. 3, comprises a server 101, connected to a database 102 of locations (e.g. for each area and objects/items). The system communicates with a user's 103 mobile terminal 104 through a communication network 105. Additional databases 106 from third party may also be connected to the system for additional data, advertisement, navigation etc.

The database 105 stores location information. The location information may include layout or plan of shops, inventory, etc. The information may be pre-defined (e.g. addresses) or automatically defined (GPS) or manually provided as they are visited. Besides location information, the database may comprise item/goods information.

Most of the items can be linked to locations. In one embodiment, the system may interpret the items and link them to locations The user's terminal 104 contains a list (or items, addresses, positions). In case of a pick list, each pick list may contain a subset of possible entries and can thereby connected to a subset of possible locations. Pick lists may be created by the user in numerous various ways, depending on the application. For example, for goods in a grocery store, the pick list can be created through text or voice entrance or scanning bar codes or be created on a different computer system and communicated (e.g. SMS, MMS, email, etc.) to the user.

The user may have the option to prior to the visit in the area, manually sort the entries in the pick list.

There may be one or more start and end points e.g. in the store. The start and end points need not to coincide. Which start and end points are used for a specific visit to the area can be entered by the user, or automatically detected by sensors (e.g. GPS, cell towers, WiFi, Bluetooth, etc.), or automatically guessed based on which location within the area the user visits first. For example, some stores may have several entrances and/or some items may occur in more than one location in a store.

The user marks in the pick list when an item is picked. The system saves information, such as time, device id, sensor information (GPS, cell towers, Wi-Fi, Bluetooth, gyro, compass direction, etc.). Marking of the items in the pick list can be done in various ways through the terminal or computer through keyboard or marking in a smart watch or voice entrance (or other "smart" wearables, VR devices etc.).

Normally, the user may try to pick the items in an order that makes his route as short as possible. Of course, the method of the invention expects that the user does not try to "sabotage" input, while some individual outcomes can be non-optimal due to poor knowledge of the user. Here, "outcome of the pick list" means pick list together with the pick markings and the system saved information.

According to one aspect of the invention, during the time the user visits the location, the system can continuously or periodically save information about the surroundings, e.g. using GPS, cell towers, Wi-Fi, Bluetooth, gyro, compass direction, etc.

Each outcome of the pick list can be linked to a specific area (e.g. via the terminal's sensors). The areas may be pre-defined or defined as soon as a user visits the area.

Figure 4:
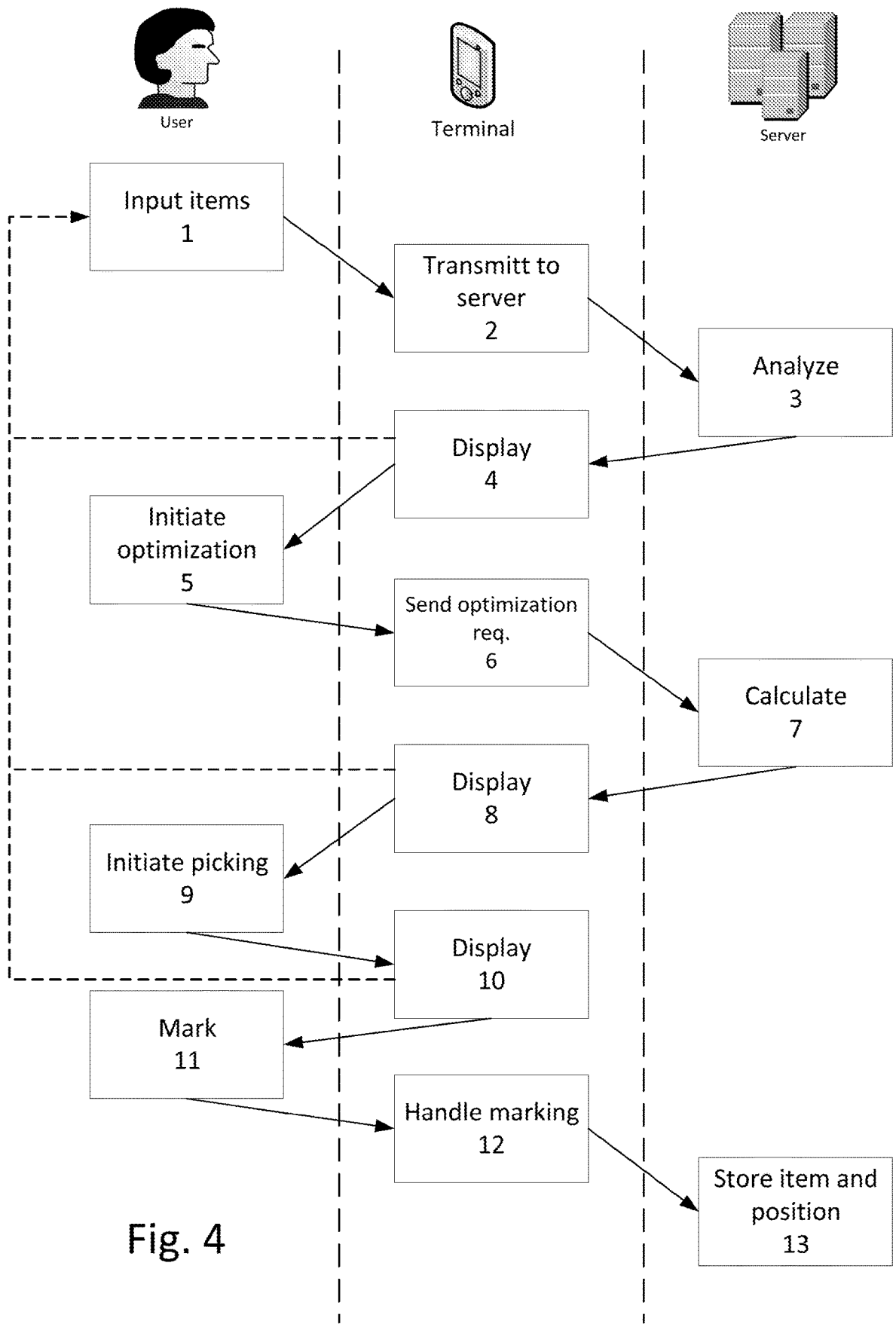
FIG. 4 illustrates the operation of the system of the present invention.

FIG. 4 illustrates the steps in accordance with one aspect of the invention:

1. The user inputs (or obtains) a list of items (e.g. shopping list);
2. The list is transmitted to the application server (101) by the terminal (104), e.g. using a messaging application, such as email, SMS, MMS or uploading; the communication network 105 may be used for this purpose or a Wi-Fi/Bluetooth or similar network e.g. at the store;
3. The server analyzes the content and searches for items and locations in the database; an item list or a suggestion is transmitted to the terminal;
4. The terminal displays the list to the user; In one embodiment, the returned list may comprise similar products if exact product is not found and/or advertisement for similar or related products may be provided;
5. The user initiates optimization. This can be done by providing area (store) or the position can be selected automatically;
6. The request is sent to the server together with the information;
7. The server starts the optimization routine, which is described in more detail below;
   An optimized list (picking order or directions) is generated and sent to the terminal;
8. The terminal displays the list including matched products. The list may be a text list or a graphical view (map) of the route including shelf plans or the like;
9. The user may initiate a picking view (it may also be initiated automatically);
10. Terminal displays the picking view;
11. The user marks the picked items on the terminal;
12. The terminal converts the marked items and transmits data to server. Data may be transmitted sequentially in order of marking or as a list.
13. The server stores marked items and positions.

In one embodiment, steps 3 and 4 may be eliminated and a route list be provided to the user directly.

Allowing new inputs (dashed lines from 4, 8 and 10) makes the system dynamic.

Figure 5:
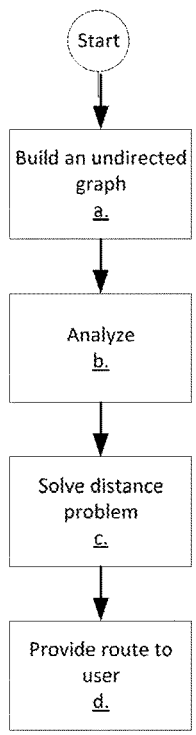
FIG. 5 illustrates steps of a routine of the operation of the system of the present invention.

FIG. 5 illustrates exemplary steps of the routine of the invention for optimizing the route/pick. The steps may be executed in the server or the terminal:

a. For each area, build an undirected graph where each location is a node, and each pair of nodes that probably is "closest" to each other has an edge between them with a length that varies with the probability that they are "closest" to each other;

b. For each combination of user, area and pair of possible location, analyze if it is likely that one location always will be visited before others (this indicates that the route the user usually takes in a certain area and is used for personalizing routes);
c. When sorting by a pick list, solve a Traveling Salesman Problem (TSP) (or the like) in the aforementioned graph with an algorithm that takes into account both using probabilities and providing a solution, individually tailored for the user under the preceding step. The solution of the TSP-problem, produced by using, e.g. a k-opt-algorithm, may then be used to optimize the sorting of the items in the list.

During the time the user visits an area, the pick list may be sorted based on data collected during the visit, e.g. if a store has multiple entrances, sorting is better if the entrance is known and is used for just this visit. Also, changes made to the list during a visit may result in a new sorting order.

Figure 6:
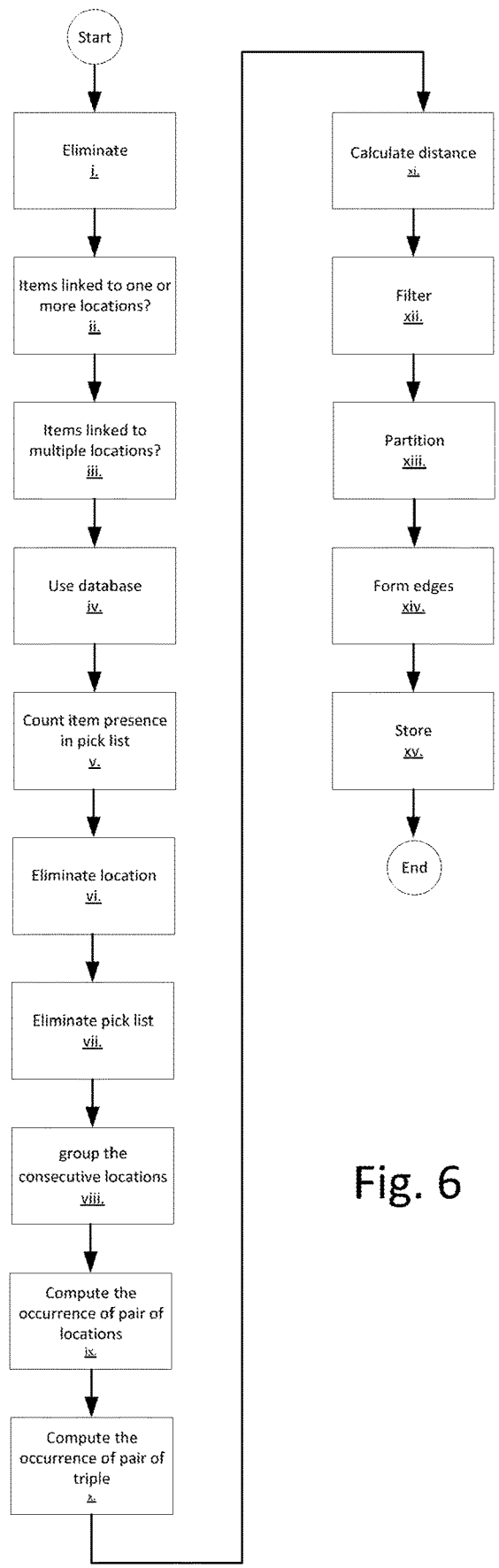
FIG. 6 illustrates steps of a routine of the operation of the system of the present invention.

The algorithm for building the graph of locations in an area is based on analysis of previous outcomes of pick lists in one area. See FIG. 6. The steps may include:
  i. Eliminate the pick lists that do not seem to come from a real visit to the area. For example, if the position or the time of a marking in the pick list does not appear to be correct.
  ii. For each pick list, do not use the individual items in the pick list that cannot be linked to one or more locations. For example, it is not always possible to understand/interpret what the user enters.
  iii. For each pick list, do not use the items in pick list, which could be linked to multiple locations if there is no sufficient data to distinguish the locations. For example, certain items may be in several locations in a store, and without access to data indicating the location (e.g. from sensors), it is not distinguishable from which places each user has picked the goods. The products that are in several locations are available in a database that can be created through manual entry or automatic analysis.
  iv. Use a database on which locations that are so close that they can be considered to be at the same place, to group in each pick list the consecutive items that can be considered as the same place. The database of locations can be created manually or by automatic analysis of areas.
  v. For each pair of locations, compute their presence in all pick lists. For each pair where the locations were picked in direct sequence of a qualified majority of cases, but where the internal order does not seem to matter, one can consider the two locations to be the same location.
  vi. Eliminate one of the locations in all of the pick lists.
  vii. Eliminate the pick lists containing too few places to bring forward the analysis. For example, shopping lists that contain less than three goods are discarded.
  viii. For each pick list, group the consecutive locations that have been picked within an unreasonably short time and use instead the user's manual sort to determine the outcome. If the user has no manual sorting, the order of the goods within the group is not used. If a location is visited in an unreasonably short time after another location, it can be suspected that the user has marked both locations as picked on the same physical location instead of their respective physical locations.
  ix. For all outcomes of pick lists for this area, compute the occurrence of each pair of locations. The pair "AB" is considered the same as "BA".
  x. For all outcomes of pick lists for this area, compute the occurrence of each triplet (combination of three locations). The combination "ABC" is considered the same as "CBA". Using the calculated statistics, calculate the probability that two locations are "closest" to each other. Two locations that are "closest" have no other locations between them. That is, for each pair of points A and B and any other location x:

$$P_{closest} = P_{always\ together} \times (1 - \max_x P_{AxB})$$

$$P_{always\ together} = n_{AB}/n_{AxB} \forall x$$

$$P_{AxB} = n_{AxB}/(n_{ABx} + n_{xAB} + n_{AxB})$$

wherein n is the number of occurrences according to the aforementioned counting.
  xi. For each pair of locations calculate a distance between them as the inverse of the probability. The distances between the locations then form the length of the edges in an undirected graph where the locations are nodes.
  xii. Optionally, one can filter and cancel edges whose length is above a certain threshold. It may be chosen not to form an edge between two nodes whose edge is over a certain length. This may give a better result, and reduces the amount of data, than if one forms edges between more pairs of nodes. But both methods are applicable.
  xiii. If edges are disregarded, the graph can be partitioned. For each pair of nodes, where nodes are in different partitions, calculating a distance between the nodes in the following manner:

$$d_{AB} = \sum_{y=0}^{\infty} ((y+1) \times n_{AyB}) / \sum_{y=0}^{\infty} n_{AyB}$$

wherein y is the number of goods taken between A and B and n is the number of occurrences.
  xiv. Between the nodes having the shortest distance, edges are then formed having length equal to the calculated distance. One can choose to form edges between just a couple of nodes or several pairs. Of course, there are several other possible methods to connect the partitions.
  xv. The nodes/edges (locations/distances) are stored in the database (e.g. 102) and used to later sort new pick lists.

If one has access to a limited map, one can also use this limited data to influence the outcome of the graph. For example, if a rough/schematic map is available displaying the placement of certain grocery categories in the store or if there are dedicated locations for items from different grocery categories but with similar special properties such as raw, ecological, fair trade etc.

If one has access to information that shows that the area is similar to another area, the similar area data can be used to influence the outcome of the graph. For example, stores in a chain of grocery stores have similar placement of grocery categories/groceries.

If sensor data to an outcome of the pick list is accessible, this data can be used to influence the outcome of the graph. For example, the analysis of signal strengths of Wi-Fi-/Bluetooth-sources in a store provides a rough estimate of the physical switch-on the separation between the locations.

Figure 7:
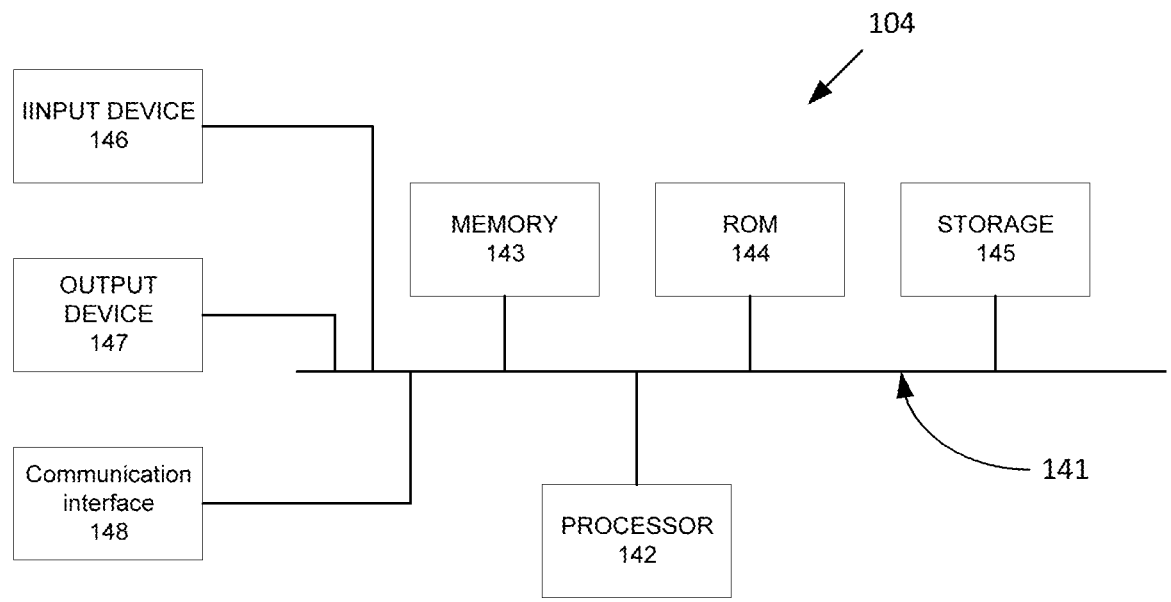
FIG. 7 illustrates schematically a communication device according to one embodiment of the present invention.

FIG. 7 is a diagram of an exemplary terminal 104 in which methods and systems described herein may be implemented. The terminal 104 may include a bus 141, a processor 142, a memory 143, a read only memory (ROM) 144, a storage device 145, an input device 146, an output device 147, and a communication interface 148. Bus 141 permits communication among the components of terminal 104. Terminal 100 may also include one or more power supplies (not shown). One skilled in the art would recognize that terminal 101 may be configured in a number of other ways and may include other or different elements.

Processor 142 may include any type of processor or microprocessor that interprets and executes instructions. Processor 142 may also include logic that is able to decode media files, such as audio files, video files, multimedia files, image files, video games, etc., and generate output to, for example, a speaker, a display, etc. Memory 143 may include a random access memory (RAM) or another dynamic storage device that stores information and instructions for execution by processor 142. Memory 143 may also be used to store temporary variables or other intermediate information during execution of instructions by processor 142.

ROM 144 may include a conventional ROM device and/or another static storage device that stores static information and instructions for processor 142. Storage device 150 may include a magnetic disk or optical disk and its corresponding drive and/or some other type of magnetic or optical recording medium and its corresponding drive for storing information and instructions. Storage device 145 may also include a flash memory (e.g., an electrically erasable programmable read only memory (EEPROM)) device for storing information and instructions.

Input device 146 may include one or more conventional mechanisms that permit a user to input information to the terminal 104, such as a keyboard, a keypad, a directional pad, a mouse, a pen, voice recognition, a touch-screen and/or biometric mechanisms, etc. Output device 147 may include one or more conventional mechanisms that output information to the user, including a display, a printer, one or more speakers, etc. Communication interface 180 may include any transceiver-like mechanism that enables terminal 104 to communicate with other devices and/or systems. For example, communication interface 148 may include a modem or an Ethernet interface to a LAN. Alternatively, or additionally, communication interface 148 may include other mechanisms for communicating via a network, such as a wireless network. For example, communication interface may include a radio frequency (RF) transmitter and receiver and one or more antennas for transmitting and receiving RF-data.

Terminal 104 may display information associated with route viewed by a user of terminal 104 in a graphical format. According to an exemplary implementation, terminal 104 may perform various processes in response to processor 142 executing sequences of instructions contained in memory 143. Such instructions may be read into memory 143 from another computer-readable medium, such as storage device 145, or from a separate device via communication interface 148. It should be understood that a computer-readable medium may include one or more memory devices or carrier waves. Execution of the sequences of instructions contained in memory 143 causes processor 142 to perform the acts that will be described hereafter. In alternative embodiments, hard-wired circuitry may be used in place of or in combination with software instructions to implement aspects consistent with the invention. Thus, the invention is not limited to any specific combination of hardware circuitry and software.

The terminal may comprise any of a RF enabled terminal, cell phone, personal shopper terminal (barcode scanner), PDA, iPad, tablet, smart watch etc.

In one embodiment, the terminal may comprise an image recorder and the user may take pictures of the items/objects, which after image processing (and/or OCR) detects the item and checks it in the pick list.

The positioning of the terminal may be carried out by using any type of positioning, motion detection and identification of the location allowed by the terminal, e.g. GPS, GLONASS, triangulation, optical, IR, pedometer, compass, gyro sensors etc. or a combination thereof. In a store for example, RF beacons may be used for data exchange and positioning. Wi-Fi or Bluetooth access points/transceivers may also be used for identification and positioning of the terminal location.

Figure 8:
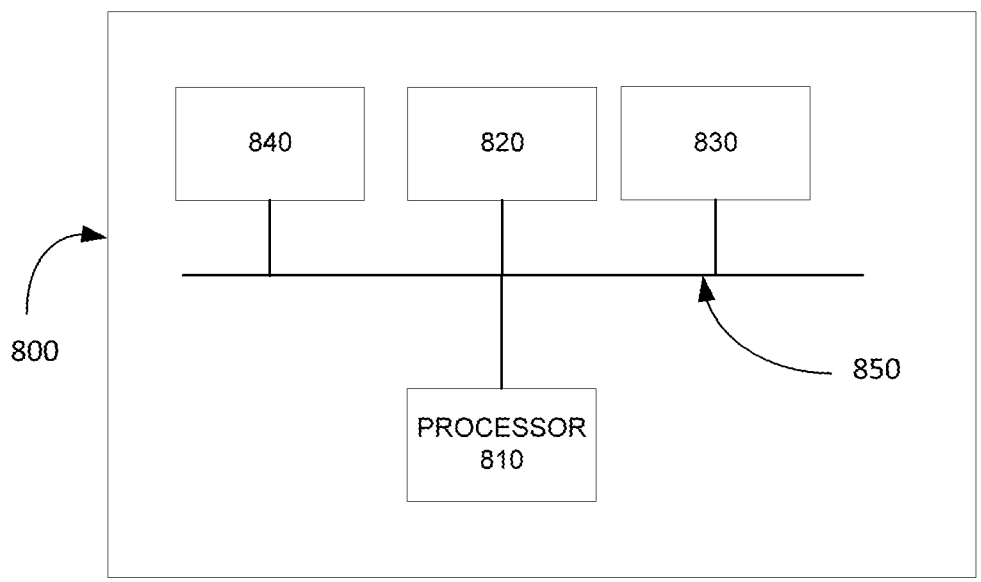

FIG. 8 illustrates an exemplary server. The term server as used herein concerns a computer 800, which in its simplest configuration comprises a processing unit 810, a memory 820, I/O interface 830 and a storage device 840, interconnected by means of a bus 850. The server in which parts of methods and systems described herein may be implemented may comprise a conventional computer.

The bus 850 permits communication among the components of server 800. The server may also include one or more power supplies (not shown). One skilled in the art would recognize that server may be configured in a number of other ways and may include other or different elements.

Processor 810 may include any type of processor or microprocessor that interprets and executes instructions. Processor 810 may also include logic to execute different types of instructions, and generate output to, for example, displays, computer network etc. The memory 820 may include a random access memory (RAM) or another dynamic storage device that stores information and instructions for execution by processor 810. Memory 820 may also be used to store temporary variables or other intermediate information during execution of instructions by processor 810.

Additional ROM memory may be implemented and may include a conventional ROM device and/or another static storage device that stores static information and instructions for processor 810. Storage device 840 may include a magnetic disk or optical disk and its corresponding drive and/or some other type of magnetic or optical recording medium and its corresponding drive for storing information and instructions. Storage device 840 may also include a flash memory (e.g., an electrically erasable programmable read only memory (EEPROM)) device for storing information and instructions.

I/O interface 830 may include user I/O devices and communication one or more conventional mechanisms that permit a user to input information to the server, such as a keyboard, a keypad, a directional pad, a mouse, a pen, voice recognition, a touch-screen and/or biometric mechanisms, etc. I/O interface may also include one or more conventional mechanisms that output information to the user, including a display, a printer, one or more speakers, etc. I/O interface may include any means that enables the server to communicate with other devices and/or systems. For example, the interface may include a modem or an Ethernet interface to a LAN. Alternatively, or additionally, the interface may include other mechanisms for communicating via a network using RF, such as a wireless network, WLAN.

According to an exemplary implementation, the server may perform various processes in response to processor 810 executing sequences of instructions contained in memory

820. Such instructions may be read into memory 820 from another computer-readable medium, such as storage device 840, or from a separate device via communication interface 830. It should be understood that a computer-readable medium may include one or more memory devices or carrier waves. Execution of the sequences of instructions contained in the memory causes processor 810 to perform the acts that have been described earlier. In alternative embodiments, hard-wired circuitry may be used in place of or in combination with software instructions to implement aspects consistent with the invention. Thus, the invention is not limited to any specific combination of hardware circuitry and software.

In use, the memory stores the programs which when executed carry out the methods of the invention.

Additional embodiments of the invention may comprise methods in which based on previous outcomes of picking lists for a geographic location, time, the user and type of items that were in the list (i.e. "goods"), the system may predict an object's state. For example, some stores do not have a deli-counter or fresh fish, if a user lives in the town but has a summer house the user buys different varieties of same product, so if it is winter, probably strawberries are not fresh, etc.

In yet another embodiment consideration is made for product placement. E.g. chain stores decorate sometimes shops in a similar manner—both order of the departments, as well as their design with shelf planning, etc. If there are not enough results from pick lists for such a place but know what kind of store/location it is, the system can sort the list based on results from a similar store/place.

With sufficient outcomes of picking lists, the system can, by comparing the user information, be able to determine the location of the picking list, if this is missing. Likewise, the system may ultimately be able to guess the gender, age and demographics of users, if this is missing.

The various embodiments of the present invention described herein is described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware The foregoing description of embodiments of the present invention, have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

The invention claimed is:

1. A computer-implemented method for optimizing a travelling route in an area, the area comprising locations of items to visit with respect to an electronic list obtained from a mobile terminal of a user, optimizing the travelling route comprising:

analyzing content of the electronic list by a processing unit, said electronic list comprising a plurality of entries without location information about items in the area;

comparing, by the processing unit, the entries of the electronic list with information from the area stored in a memory, wherein the stored information from the area is collected and processed based on a previous visit to the area and the stored information from the area comprises the location of the items in the area;

linking the plurality of entries of the electronic list to the items in the area and the locations of the items and sorting the plurality of entries of the electronic list, by said processing unit;

generating, by said processing unit, a sorted route list comprising a calculated shortest distance between locations of the entries of the sorted route list based on a result of an undirected graph;

wherein the shortest distance is calculated, by the processing unit, by:

building, for the area, the undirected graph in which each location for the items is realized as a node, in response to detecting that the area is similar to another area, influencing the result of the undirected graph by using data from the other area, in response to sensor data, determining one of several entrances, when several entrances are available, to the area, and influencing the result of the undirected graph by using the sensor data, wherein the sensor data is received from a positioning arrangement, determining, by using the positioning arrangement, a physical entrance point to the area, which determines a starting point for the electronic list,
wherein the positioning arrangement comprises one or several of GPS, GLONASS, triangulation, optical positioning, IR positioning, RF beacons, Wi-Fi, or Bluetooth, and
calculating a probability that two nodes are closest to each other.

2. The method of claim 1, wherein the electronic list comprises a pick list.

3. The method of claim 1, further comprising the steps of:
a computer receiving said electronic list comprising the plurality of entries including a plurality of items;
the computer processing the electronic list and linking the plurality of items to possible locations in the area and grouping the same;
generating a route list with respect to the plurality of items and possible locations with lack of access to fully predefined area information with locations of said items;
providing the mobile terminal with the resulted route; and
completing the route with respect to the user completing the electronic list by visiting items of said plurality of items.

4. The method of claim 3, further comprising generating a route list with respect to the plurality of the items and with lack of access to locations of predefined area information and dynamically updating the route list if the electronic list changes between visit of the items.

5. The method of claim 1, further comprising:
for a combination of the user, an area and a pair of possible locations: analyzing a likelihood that one location will be visited before the other.

6. The method of claim 1:
wherein the electronic list is a pick and/or route list, and the method further comprising one or several of:
obtaining information from a database about locations of items, and grouping in a list the consecutive items that can be considered linked to the same location;
for each pair of locations, computing its presence in the electronic list;
eliminating one of the locations in the electronic list;
eliminating the electronic list, in response to determining that the plurality of entries is less than a threshold;
for each electronic list, grouping consecutive items that have been picked within an unreasonably short time and using instead a user's manual sort to determine an outcome to an optimization problem;
for outcomes of the optimization problem for the electronic list for a specific area, computing an occurrence of each pair of locations;
for outcomes of the optimization problem for the electronic list for an area, computing an occurrence of each triplet; and
for each pair of locations, calculating a distance between them as the inverse of the probability.

7. The method for claim 6, wherein the electronic list is a pick and/or route list, and the method further comprising for each pick and/or route list, not using individual entries in the pick and/or route list that cannot be linked to one or more locations, after eliminating the pick and/or route lists that are determined not to come from a real visit to an area.

8. The method of claim 6, further comprising one or several of:
filtering and cancelling edges whose length is above a certain threshold;
if edges are disregarded, partitioning the undirected graph;
between the nodes having the shortest distance, forming edges having length equal to the calculated distance; and
storing the nodes and edges in a database.

9. The method of claim 6, wherein if edges are disregarded, the undirected graph is partitioned, for a pair of nodes, where nodes are in different partitions, calculating a distance between the nodes in the following manner:

$$d_{AB} = \sum_{y=0}^{\infty} ((y+1) \times n_{AyB}) \bigg/ \sum_{y=0}^{\infty} n_{AyB}$$

wherein y is the number of items picked between A and B, and n is the number of occurrences of a location.

10. The method of claim 1, comprising the step of using a Travelling Salesman Problem (TSP) for route optimization and for all results of solved problem of lists for a specific area, computing the occurrence of each pair of locations further comprising using calculated statistics, calculating the probability that two nodes are closest to each other, wherein two locations that are closest have no other location between them, i.e. for each pair of nodes A and B and any other location x:

$$P_{closest} = P_{always\ together} \times (1 - \max_x P_{AxB})$$

$$P_{always\ together} = n_{AB}/n_{AxB} \forall x$$

$$P_{AxB} = n_{AxB}/(n_{ABx} + n_{xAB} + n_{AxB})$$

wherein n is the number of occurrences of a location.

11. The method of claim 1, comprising the step of using a Travelling Salesman Problem (TSP) for route optimization and if a location is visited in an unreasonably short time after another location, assuming that the user has marked both locations as picked from the same physical location instead of their respective physical locations.

12. The method of claim 1, comprising the step of using a Travelling Salesman Problem (TSP) for route optimization and the method comprises: for a pair of locations, compute their presence in the electronic list and for a pair where the locations were picked in direct sequence of a qualified majority of cases, but where the internal order does not matter, consider the two locations to be the same location.

13. The method of claim 1, further comprising,
canceling one or more of the items in the stored information from the area that do not come from the previous visit to the area:
if a location of the one or more items or a time of the previous visit to the location of the one or more items is incorrect; or
if one or more of the items is linked to multiple locations and no data is available to distinguish the multiple locations.

14. A computer program product for optimizing a route for an area based on an electronic list of items obtained from a user, the computer program product comprising:
one or more non-transitory computer-readable tangible storage devices and program instructions stored in at least one of the one or more non-transitory storage devices, the program instructions comprising:

instructing a processor to analyze said electronic list of items, instructing the processor to compare items of said electronic list with information about items from the area and calculated distances between the items, wherein the information and the calculated distances from the area are collected, processed, and assembled based on a previous visit to the area, instructing the processor to sort the entries of the electronic list based on said calculated distances, instructing the processor to, for the area, build an undirected graph in which each location for each of the items from the area is realized as a node, instructing the processor to, in response to detecting that the area is similar to a different area, influence the result of the undirected graph by using data from the different area, instructing the processor to, in response to sensor data, determine one of several entrances, when several entrances are available, to the area, and influence the result of the undirected graph by using the sensor data, wherein the sensor data is received from a positioning arrangement, instructing the processor to determine, using the positioning arrangement, a physical entrance point to the area, which determines a starting point for the electronic list, wherein the positioning arrangement comprises one or several of GPS, GLONASS, triangulation, optical positioning, IR positioning, RF beacons, Wi-Fi, or Bluetooth, instructing the processor:
to calculate a probability that a pair of nodes are closest to each other;
for each user, area, and pair of possible locations: analyze a likelihood that one location always will be visited before the other;
when sorting a route list, solve an optimization problem, which is a Travelling Salesman Problem (TSP) in the undirected graph by using probabilities and provide a solution, individually tailored for the user in the preceding step; and
generate a sorted route list comprising the items and a shortest distance between the locations of the items in the sorted route list based on the result of the undirected graph.

15. The computer program product of claim 14, further comprising:
program instructions to receive said electronic list including a plurality of items;
program instructions to process the electronic list with respect to location information;
program instructions to generate a route list with respect to the items of said electronic list and with lack of access to predefined area information for locations of said items;
program instructions to provide a user terminal with the route list; and
program instructions to complete the route list with respect to the user completing the electronic list by visiting items of the plurality of items.

16. The computer program product of claim 14, further comprising program instructions to instruct the processor:
to cancel one or more of the items in the information from the area that do not come from the previous visit to the area:
if a location of the one or more items or a time of a visit to the location is incorrect; or
if the one or more items is linked to multiple locations and no information is available to distinguish the locations in the multiple locations.

17. A computer unit comprising: a processing unit, a memory and a communication interface, the processing unit being configured to:
receive an electronic list including a plurality of items to be visited in an area,
compare by said processing unit the plurality of items of the electronic list with information from the area, wherein the information is based on a previous visit to the area, and comprises the information about the items in the area and calculated distances between the items,
build an undirected graph for the area in which each location for each of the items is realized as a node;
in response to detecting that the area is similar to a different area, influence the result of the undirected graph by using data from the different area,
in response to sensor data, determining an entrance, amongst several entrances, when several entrances are available to the area, and influencing the result of the undirected graph by using the sensor data,
wherein the sensor data is received from a positioning arrangement,
determine, using the positioning arrangement, a physical entrance point to the area, which determines a starting point for the electronic list,
wherein the positioning arrangement comprises one or several of GPS, GLONASS, triangulation, optical positioning, IR positioning, RF beacons, Wi-Fi, or Bluetooth,
link the plurality of items to the locations in the area and sort said electronic list based on said calculated distances,
for each user, area, and pair of possible locations: analyze if it is likely that one location will be visited before the other; and
when sorting a route list, solving an optimization problem, which is a Travelling Salesman Problem (TSP) in the undirected graph by using probabilities and provide a solution, individually tailored for a user; and
generate a sorted route list comprising a shortest path between the items in the electronic list based on the result of the undirected graph.

18. The computer unit of claim 17, wherein the processing unit is further configured to:
cancel items in the information that do not come from a real previous visit to the area:
if the location or a time of visit to the location is incorrect; or if an item is linked to multiple locations and no data is available to distinguish the locations in the multiple locations.

19. A computer-implemented method for optimizing a travelling route in an area, the area comprising locations of items to visit and/or pick with respect to an electronic pick list visualized on a mobile terminal of a user, the optimizing the travelling route comprising:
analyzing content of the electronic list by a processing unit, the electronic list comprising a plurality of entries without location information in the area;
comparing by said processing unit the entries of the electronic pick list with information from the area stored in a memory, wherein the stored information is collected and processed based on a previous visit to the area and comprises information about locations of items in the area and calculated distances between the locations of the items;
linking the plurality of entries of the electronic list to the items in the area and the locations of the items and sorting the plurality of entries of the electronic list by said processing unit based on said calculated distances;
generating, by said processing unit, a sorted route list, which comprises a calculated shortest distance between locations of the plurality of entries of the route list based on a result of an undirected graph;
wherein calculation of the shortest distance by the processing unit comprises:
for the area building the undirected graph in which a location for an item is realized as a node,
in response to detecting that the area is similar to a different area, influence the result of the undirected graph by using data from the different area to influence the result of the undirected graph,
in response to sensor data, determining an entrance, amongst several entrances, when several entrances are available to the area, and influencing the result of the undirected graph by using the sensor data,
wherein the sensor data is received from a positioning arrangement,
determine, using the positioning arrangement, a position of an item in the electronic list,
wherein the positioning arrangement comprises one or several of GPS, GLONASS, triangulation, optical positioning, IR positioning, RF beacons, Wi-Fi, or Bluetooth,
calculate a probability that two nodes are closest to each other, and
for each user, area, and pair of possible locations: analyzing a likelihood that one location will be visited before the other.

* * * * *